United States Patent

[11] 3,534,716

| [72] | Inventors | Daisaku Odawara<br>Saki-shi;<br>Hisao Sugimoto, Kanagawa-ken and Tsutomu Sato, Osaka-shi, Japan |
|---|---|---|
| [21] | Appl. No. | 740,641 |
| [22] | Filed | June 27, 1968 |
| [45] | Patented | Oct. 20, 1970 |
| [73] | Assignee | Kubota Tekko-Kabushiki Kaisha<br>Osaka-shi, Japan |
| [32] | Priority | July 18, 1967 |
| [33] | | Japan |
| [31] | | 42/45,832 |

[54] METHOD OF SUPPLYING AN EXCESS AMOUNT OF AIR OR FUEL-AIR MIXTURE TO A INTERNAL COMBUSTION ENGINE AND AN APPARATUS THEREFOR
7 Claims, 8 Drawing Figs.

[52] U.S. Cl. .................................................. 123/75, 123/190
[51] Int. Cl. .................................................. F01l 7/00, F02b 15/00
[50] Field of Search ........................................... 123/75(B), 190(B), 190(B1), 190(B2), 190(B3), 190(B4)

[56] References Cited
UNITED STATES PATENTS

| 1,314,378 | 8/1919 | Tismer ........................ | 123/75B |
| 1,444,857 | 2/1923 | Taub ........................... | 123/190(B3)UX |
| 1,563,789 | 12/1925 | Redrup ........................ | 123/75(B)UX |
| 1,629,795 | 5/1927 | Jobes ........................... | 123/75(B)UX |
| 2,107,389 | 2/1938 | Price et al. .................. | 123/190(B3)UX |

Primary Examiner—Wendell E. Burns
Attorney—McGlew and Toren

ABSTRACT: A method of supplying an excess amount of air or fuel-air mixture to a internal combustion engine by arranging a control valve in the exhaust passage disposed in the cylinder head of said engine, and an arrangement for carrying out the method. The control valve is operated in such manner that, during the suction stroke of the engine, suction takes place through the exhaust passage in addition to the intrinsic suction passage, which results in an increase of the amount of air or fuel-air mixture supplied to the internal combustion engine to enhance the output power thereof.

Patented Oct. 20, 1970

3,534,716

INVENTORS
DAISAKU ODAWARA
HISAO SUGIMOTO
TSUTOMU SATO

BY McGlew and Toren

ATTORNEYS 3,534,716

1

METHOD OF SUPPLYING AN EXCESS AMOUNT OF AIR OR FUEL-AIR MIXTURE TO A INTERNAL COMBUSTION ENGINE AND AN APPARATUS THEREFOR

BACKGROUND OF THE INVENTION

The present invention relates to a method of supplying an excess amount of air or fuel-air mixture to an internal combustion engine and an apparatus therefor.

In general, the maximum output power of an internal combustion engine is restrictedly influenced by such factors as the amount of air consumed in the combustion for a unit time, mechanical stresses and thermal stresses.

It is known that the factor which plays the leading part in reducing or restricting the output power of the engine is in most cases the insufficient amount of air supplied to the engine. In a conventional internal combustion engine, a suction valve or suction valves and an exhaust valve or exhaust valves are separately provided in a cylinder head and adapted to be operated separately. With such arrangement, it has been often difficult to provide a suction valve with a sufficiently large suction area, which results in a restriction in the amount of air as sucked, and hence in the maximum output power of the engine. In order to obviate such difficulty, it has been proposed to enlarge the dimensions of the suction valve or to increase the number of suction valves as used. However, such proposition has also encountered difficulties which are due to manufacturing problems.

Furthermore, it is well known that a supercharger is employed to supercharge the engine with air, namely to supply an excess amount of air to the engine, thereby to eliminate such difficulties as above mentioned.

This method has been already widely adopted in Diesel type engines or the like.

SUMMARY OF THE INVENTION

An object of the present invention is to provide a method of increasing the amount of air supplied to an internal combustion engine to enhance the output power thereof.

The method according to this invention may be applied either to an internal combustion engine which is provided with a supercharger, or to one which has no such supercharger. The above object of this invention can be accomplished by providing an internal combustion engine having a suction passage and an exhaust passage arranged in the cylinder head thereof, wherein a suction and exhaust control valve is disposed in said exhaust passage and so operated that the suction of air or fuel-air mixture takes place also through the exhaust passage after the completion of the exhaust stroke.

More specifically, the suction passage serves for the suction of air or a fuel-air mixture as in the case of the conventional engine, while the exhaust passage, which is used only for the exhaust in the conventional engine, is constructed as a so-called exhaust and suction passage which serves for both the exhaust and the suction according to the present invention.

To this end, a control or switching valve is disposed in the exhaust and suction passage to control the exhaust and suction processes which take place in said passage.

By constructing the conventional exhaust passage in the form of an exhaust and suction passage as above-mentioned, the suction of air or a fuel-air mixture is carried out through the above exhaust and suction passage in addition to the intrinsic suction passage, whereby the amount of air as sucked is correspondingly increased.

In an advantageous embodiment of this invention, the exhaust and suction control valve is constructed in the form of a rotary valve which is rotated at a speed which bears a predetermined ratio to the speed of rotation of crank shaft.

In a further advantageous embodiment according to this invention, the rotary valve comprises an exhaust valve plate, suction valve plates and partition disks therebetween, the exhaust valve plate being adapted to control communication between an exhaust manifold and the cylinder of the engine,

2 while the suction valve plates control communication between a suction manifold and the cylinder of the engine through the exhaust passage.

The above and other objects, features and advantages of this invention will be best understood from the following description made with reference to an embodiment shown in the annexed drawings, in which.

Figure 5:
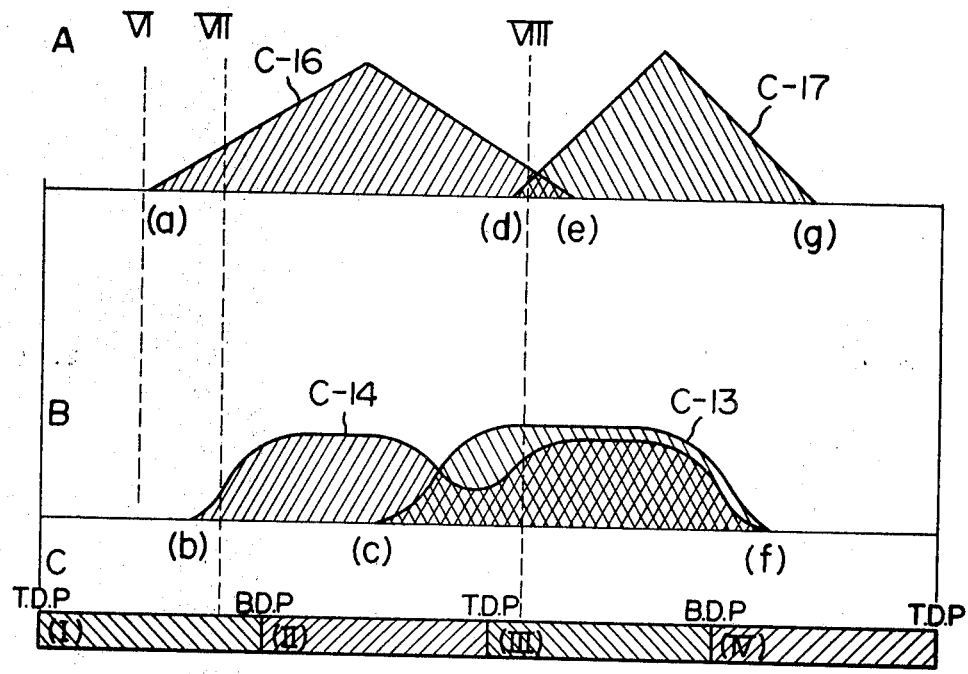
Figure 6:
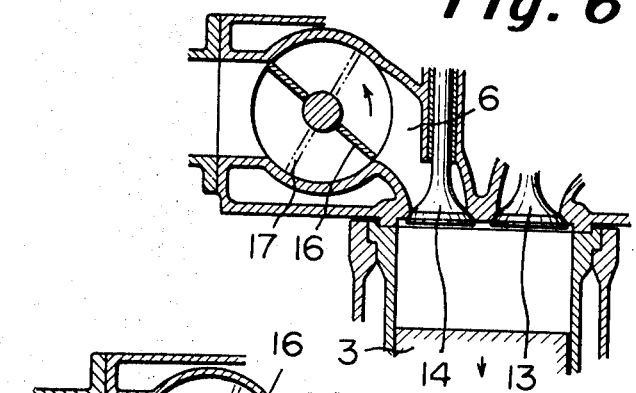
Figure 7:
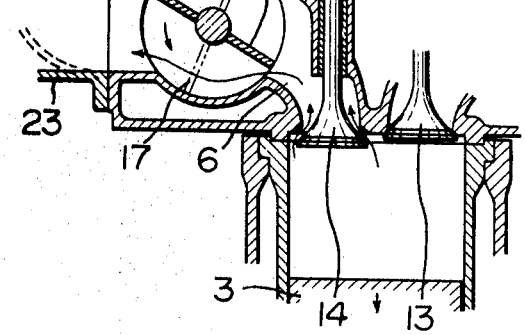
Figure 8:
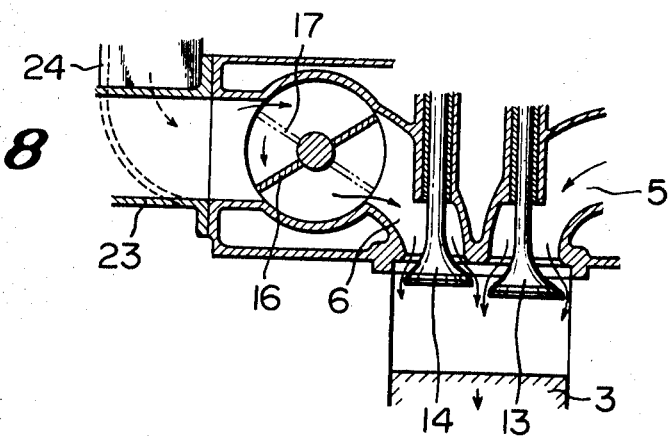

FIGS. 5A to C illustrate graphically the operation of the various valves employed in an apparatus according to this invention in conjunction with the strokes of a piston of a four-cycle internal combustion engine; and FIGS. 6 to 8 illustrate the positions taken by the various valves and piston at the points indicated by VI, VII and VIII in FIG. 5, respectively.

Figure 1:
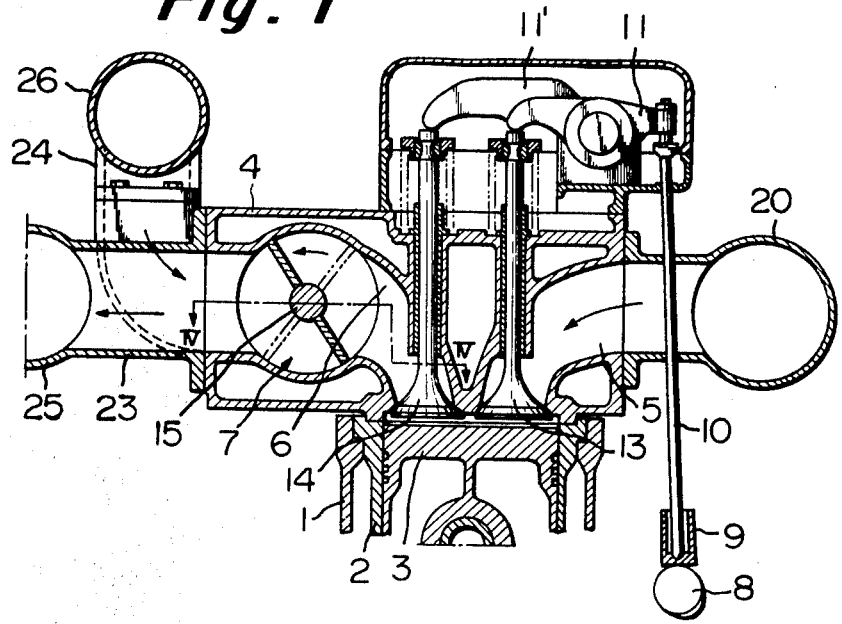
FIG. 1 is a longitudinal sectional view of the cylinder head portion of an internal combustion engine for carrying out the method of this invention.

Now, referring to FIG. 1, reference numeral 1 indicates a frame of an internal combustion engine in which a cylinder liner 2 is fitted. A piston 3 is reciprocable within the cylinder liner 2.

In FIG. 1, the piston 3 is shown as positioned at the top dead point. Mounted over the cylinder liner 2 and the piston 3 is a cylinder head 4 which is provided with a suction valve 13, an exhaust and suction valve 14, a suction passage 5 and an exhaust and suction passage 6.

Figure 2:
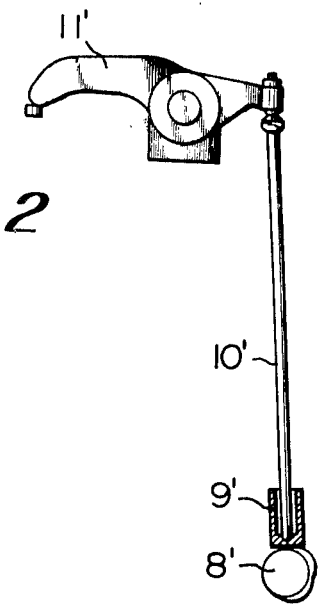
FIG. 2 is a side elevational view of members for controlling the opening and closing of the exhaust and suction valve.

An exhaust and suction control valve 7, which will be described hereinafter, is disposed in the exhaust and suction passage 6 rotatably about an axis perpendicular to the flowing direction of gas to be discharged or sucked. The suction valve 13 is of a mushroom-like configuration and is adapted to be opened and closed by a cam 8 through a tappet 9, a push rod 10 and rocker arm 11. The cam 8 is rotated at a reduced speed corresponding to one half of the rotational speed of a crank shaft (not shown). The exhaust and suction valve 14 is constructed also in a mushroom-like configuration and operated by a mechanism comprising a cam 8', a tappet 9', a push rod 10' and a rocker arm 11' as shown in FIG. 2. Reference numeral 20 indicates a suction manifold. The fresh gas fed through this suction manifold 20 flows in the suction passage 5 in the direction indicated by the arrow and into the cylinder by way of the suction valves 13.

Figure 3:
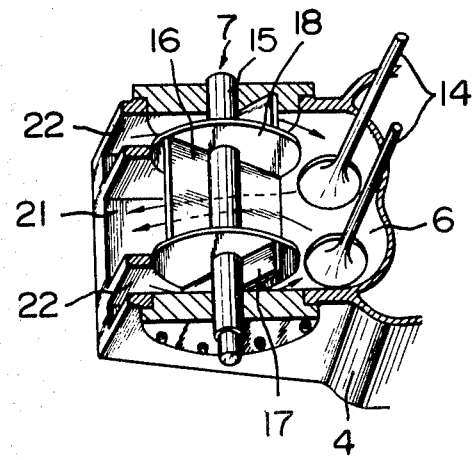
FIG. 3 is a perspective view of an embodiment of the exhaust and suction control valve.

As is shown in FIG. 3, the exhaust and suction passage 6 is partitioned or divided into a central exhaust passage 21 and lateral suction passages 22, on the left side of the control valve 7. The exhaust passage 21 and the suction passages 22 are connected to an exhaust passage 23 and a suction passage 24, respectively, at the peripheral portion of the cylinder head 4, and exhaust passage 23 and suction passage 24 are connected to an exhaust manifold 25 and a suction manifold 26, respectively. In case supercharging apparatus is employed, the suction manifolds 20 and 26 are integrally formed at the outlet of the supercharging apparatus and thereafter divided into two branches.

Figure 4:
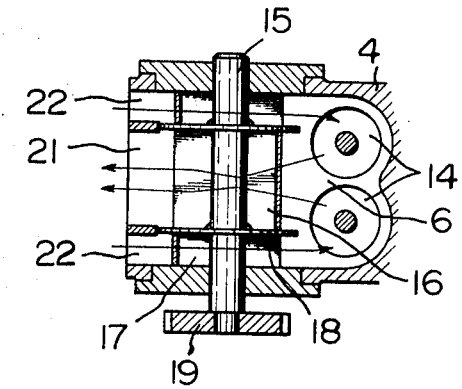
FIG. 4 is a horizontal sectional view taken along the line IV-IV in FIG. 1.

As shown in FIGS. 3 and 4, the exhaust and suction valve 7 is constructed in the form of a rotary valve which is rotatably mounted on the cylinder head 4, by means of a shaft 15, and is rotated, by a gear 19 secured to the shaft 15, in the direction indicated by the arrow in FIG. 1.

In the embodiment, herein disclosed, the control valve 7 is rotated at one-quarter the speed of the crank shaft. The control valve 7 comprises an exhaust valve plate 16, suction valve plates 17 disposed at both sides of the plate 16 and a pair of partition discs 18, each of which is interposed between the exhaust valve plate 16 and a suction valve plate 17. All the valve plates 16, 17 and the partition disks 18 are secured to the shaft 15. As will be understood from the drawings, the valve plates 16 and 17 extend diametrically of the shaft 15 and are so positioned that they intersect each other at a predetermined angle. As is apparent particularly from FIG. 3, the exhaust valve plate 16 of the control valve 7 is adapted to control the communication between the exhaust passage 21 and the exhaust and suction passage 6, while the suction valve plates 17 control the communication between the suction passages 22 and the exhaust and suction passage 6.

The above apparatus operates as follows:

Referring to FIG. 5A, the curve C-16 indicates the opening degree of the exhaust valve plate 16 of the control valve 7, while the curve C-17 indicates the opening degree of the suction plate 17. The opening degree of the exhaust and suction valve 14 and the suction valve 13 are indicated by the curves C-14 and C-13, respectively, in FIG. 5B. FIG. 5C illustrates the four strokes of the four cycle internal combustion engine.

In FIG. 5C, symbols TDP and BDP indicate the top or upper dead point and the bottom or lower dead point, respectively. In FIGS. 5A, B and C, the abscissa represents the position of piston or the time elapsed and the ordinate of FIGS. 5A and B represents the opening degree of every valve plate and valve. In FIG. 1, the engine is shown at the position corresponding to the origin in FIG. 5, namely at the initial position of the combustion and expansion stroke I, in which the piston 3 is positioned at the top dead point and the valve plates 16 and 17 of the control valve 7 as well as the valves 13 and 14 are all closed. When the piston 3 moves downwardly from the above starting position to the point (a) in FIG. 5A, the exhaust valve plate 16 begins to open.

FIG. 6 shows the position of the engine taken at this moment. In this position, the suction valve 13 and the exhaust and suction valve 14 still remain in the closed position, and the suction passage 22 is also closed by the suction valve plate 17. However, the exhaust valve plate 16 begins to open the exhaust passage 21. When the piston 3 reaches to the point (b) in FIG. 5B, the exhaust and suction valve 14 begins to open.

FIG. 7 shows the conditions of the engine at the position VII which corresponds to a point a little later than the point (b) in FIG. 5B. The combustion and expansion still takes place in the cylinder and the piston 3 continues to move downwardly. The suction valve 13 is in the closed position. However, the exhaust and suction valve 14 and the exhaust valve plate 16 are opened to some degree. In other words, the exhaust stroke already begins and the exhaust gas from the cylinder is discharged through the exhaust and suction valve 14, the exhaust and suction passage 6, the exhaust valve plate 16 of the control valve 7, the exhaust passage 21, the exhaust passage 23 and the exhaust manifold 25. However, the suction valve plates 17 of the control valve 7 still close the suction passages 22 to the exhaust and suction passage 6. When the piston 3 reaches the lower dead point, the piston 3 thereafter moves upwardly and the exhaust stroke II begins. The suction valve begins to open at the point (c) in FIG. 5B and the overlapping process of the suction valve and the exhaust valve takes place. In other words, if the internal combustion engine is provided with a supercharger, a large amount of air will flow through from the suction valve 13 to the exhaust and suction valve 14, as a result of which piston head is cooled. When the piston reaches again the top dead point, the exhaust stroke II is completed and the suction stroke III will begin. With the piston 3 reaching at the point (d) in FIG. 5A, the suction valve plates 17 of the control valve 7 begin to open the suction passages 22, while the exhaust valve plate 16 progressively closes the exhaust passage 21.

FIG. 8 shows the condition of the engine at the position VIII, in which the piston 3 moves downwardly. When the piston passes the point (e) in FIG. 5A, the exhaust passage 21 is completely closed by the exhaust valve plate 16 of the control valve 7 and the exhaust and suction passage 6 is connected only to the suction passages 22. In this position, the suction of the fuel-air mixture into the cylinder takes place not only through the suction passage 5 and the suction valve 13, but also through the path extending from the suction manifold 26 to the cylinder by way of the suction passage 24, the suction passages 22, the suction valve plates 17 of the control valve 7, the exhaust and suction passage 6 and the exhaust and suction valve 14. This condition is maintained until the piston 3 has attained the point (f) in FIG. 5B. The suction valve 13 and the exhaust and suction valve 14 are then closed with the suction coming to an end. Thereafter the engine is put into the compression stroke.

As is obvious from the foregoing, in the engine constructed for carrying out the method according to this invention, the suction of air or fuel-air mixture during the suction stroke of the engine takes place not only through the intrinsic suction passage, but also through the exhaust passage and the exhaust valve which have been employed only for the exhaust in the conventional engine. Accordingly, in an internal combustion engine according to the present invention, the suction twice as much as that of the conventional engine can be accomplished and hence the output power of the engine can be correspondingly increased. Furthermore, since cool air or mixture is sucked through the exhaust passage and the exhaust valve, the exhaust valve is thereby cooled and the life time thereof can be increased.

While the present invention has been described with respect to a particular embodiment thereof, it will be readily appreciated and understood that variations and modifications may be made without departing from the spirit or scope of the invention.

We claim:

1. A method of supplying excess air or fuel-air mixture to a cylinder of an internal combustion engine having a piston reciprocable in the cylinder, an intake manifold, an exhaust manifold, a suction valve and an exhaust valve controlling communication between the cylinder and the manifolds, a crank shaft and valve operating means interconnecting the crank shaft and the suction and exhaust valves for cyclical operation of the two valves in accordance with rotation of the crank shaft, said method comprising the steps of, during the exhaust stroke of the piston, maintaining said suction valve closed and said exhaust valve open and establishing communication between said exhaust valve and said exhaust manifold; and, during the suction stroke, opening said suction valve to connect said cylinder to said intake manifold, blocking communication between said exhaust valve and said exhaust manifold, establishing communication between said exhaust valve and said intake manifold, and opening said exhaust valve.

2. A method of supplying excess air or fuel-air mixture to a cylinder of an internal combustion engine, as claimed in claim 1, including the step of, in advance of termination of said exhaust stroke, opening said suction valve to establish communication between said intake manifold, said cylinder and said exhaust manifold.

3. A method of supplying excess air or fuel-air mixture to a cylinder of an internal combustion engine, as claimed in claim 1, including the step of overlapping, to a slight degree, the establishment of communication between said exhaust valve and said intake manifold and the blocking of communication between said exhaust valve and said exhaust manifold.

4. Apparatus for supplying excess air or fuel-air mixture to a cylinder of an internal combustion engine having a piston reciprocable in the cylinder, an intake manifold, an exhaust manifold, a suction valve and an exhaust valve controlling communication between the cylinder and the manifolds, a crank shaft and valve operating means interconnecting the crank shaft and the suction and exhaust valves for cyclical operation of the two valves in accordance with rotation of the crank shaft, said apparatus comprising, in combination, a first suction passage connecting said intake manifold to said suction valve; a suction and exhaust passage connected to said exhaust valve, said exhaust valve also constituting a further suction valve; a second suction passage connected to said intake manifold; an exhaust passage connected to said exhaust manifold; valve means interposed between said suction and exhaust passage and said second suction passage and said exhaust passage; and further valve operating means interconnecting said valve means and said crank shaft for cyclical operation of said valve means in accordance with rotation of said crank shaft; said further valve operating means, during the exhaust stroke of said piston, operating said valve means to establish communication between said exhaust valve and said exhaust passage and, during the suction stroke of said piston, blocking communication between said suction and exhaust passage and said exhaust passage and establishing communication between said suction and exhaust passage and said second suction passage; said first-mentioned valve operating means, during the suction stroke, opening said exhaust valve.

5. Apparatus for supplying excess air or fuel-air mixture to a cylinder of an internal combustion engine, as claimed in claim 4, in which said valve means comprises a rotary valve including a first valve component controlling communication between said suction and exhaust passage and said exhaust passage, and a second valve component controlling communication between said suction and exhaust passage and said second suction passage.

6. Apparatus for supplying excessive air or fuel-air mixture to a cylinder of an internal combustion engine, as claimed in claim 5, in which said first and second valve components have a predetermined angular relation in each other with respect to their operation.

7. Apparatus for supplying excess air or fuel-air mixture to a cylinder of an internal combustion engine, as claimed in claim 5, in which said rotary valve comprises a valve body having a central passage therethrough and a pair of lateral passages therethrough, one on each side of said central passage; said rotary valve further comprising a rotary member in said valve body including a pair of circular coaxial partition discs each separating a lateral passage from said central passage, first radial vanes between said partition discs and controlling flow through said central passage from said suction and exhaust passage to said exhaust passage, and second radial vanes on said partition discs in said lateral passages and controlling communication between said suction and exhaust passage and said second suction passage.